Sept. 15, 1959 K. O. ROCKEY 2,904,700
POLARIZED LIGHT SYSTEM FOR WEB EDGE CONTROL
Filed July 5, 1956
FIG. 1
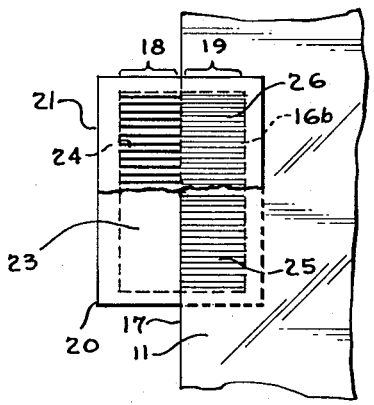
FIG. 2
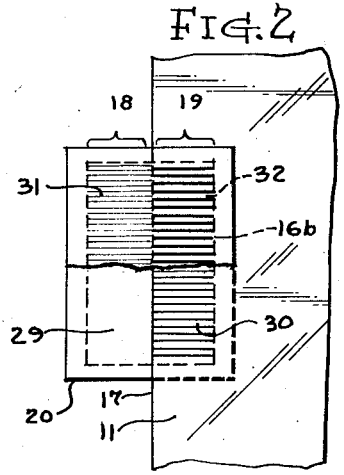
FIG. 3
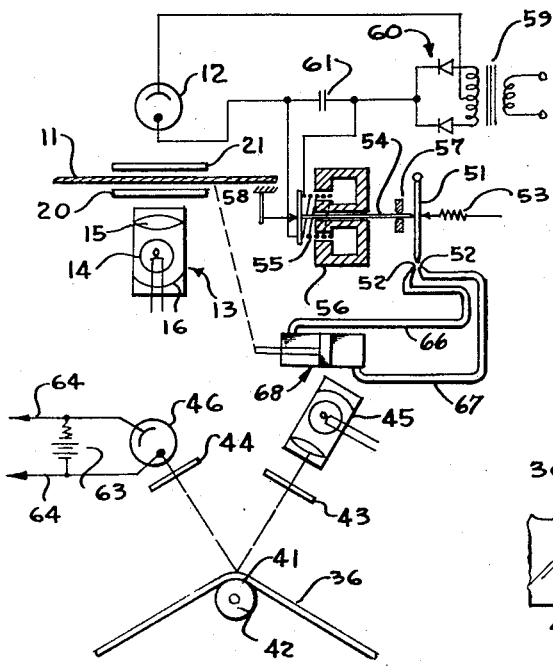
FIG. 4
FIG. 5
FIG. 6
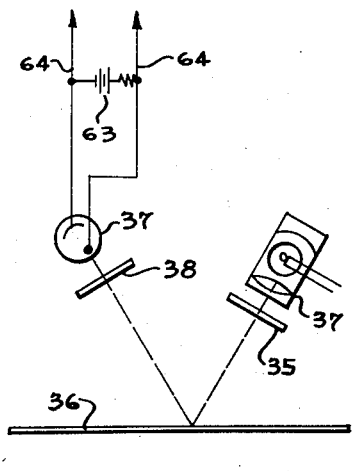
INVENTOR.
Kenneth O. Rockey
BY
Attorneys

United States Patent Office 2,904,700
Patented Sept. 15, 1959

2,904,700

POLARIZED LIGHT SYSTEM FOR WEB EDGE CONTROL

Kenneth O. Rockey, Evanston, Ill., assignor to Gpe Controls, Inc., a corporation of Illinois Application July 5, 1956, Serial No. 596,043

3 Claims. (Cl. 250—225)

In its broadest aspect, the present invention relates to arrangements of optical nature, and most usually involving light, wherein a beam, ray, or bundle of light or other radiant energy that can be polarized is directed along a preselected path to a location of utilization, with provision at an intermediate region of the path for introduction into the path, and extended either partly or completely across its cross section, of material for impingement upon that material of energy travelling in the path toward the location of utilization, and the material having a property of altering the polar condition of the radiant energy impinging upon it, the arrangement provided by the invention being in the nature of a pair of energy polarizing screens each being disposed across the energy path for transmission of the energy travelling along it, the screens being relatively oriented with respect to the planes wherein respectively they polarize energy that they transmit, to provide a preselected one of two opposite effects upon energy travelling along the path, and which may be either a substantially total blocking of the energy from reaching the utilization location provided by orientation of the screens with their polarizing planes crossed at substantially right angles, or a substantially total transmission of the energy provided by orientation of the screens with their polarizing planes parallel, and with the energy-blocking or energy-transmitting system provided by the screens oriented, if necessary, with respect to the polar condition effect of the material, to result in a total effect upon energy travelling in the path by the system including all of the screens and the material, which total effect is substantially opposite to that of the system including only the two screens.

In explanation of the foregoing statement, the invention is based on two related discoveries regarding energy directed successively to two polarizing screens. The first is that when a pair of polarizing screens are oriented, with respect to their polarizing planes, to substantially block transmission of energy through both of them, impingement of energy that is polarized by one of them upon material that has a polar condition-affecting property, as scattering, polarization-rotation, of possibly other effect, prior to travel of the energy to the second screen, will substantially destroy the energy-blocking character of the system. The practical value of this discovery is that indication may be had of presence or absence of the material having the noted property, or the position of an edge of a body of such material, in a region between two polarizing screens oriented with their polarization planes crossed at right angles, by destruction or reduction of the blocking property of the two-screen system in so much of the cross section of the energy beam that impinges on the material, and resulting in transmission by the second screen of the energy that has impinged on the material while any of the polarized energy reaching the screen without having impinged on the material is blocked by the second screen.

The second discovery is that when the screens are relatively oriented to transmit energy, by parallel disposition of the planes wherein they polarize, impingement of the energy that has been polarized by the first screen upon a material having a polarization-affecting property such as polarization-rotation, repolarization in another plane, or even scattering alone, will destroy or materially diminish the energy-transmitting characteristic of the two-screen system. The practical value of the second discovery is that indication may be had of presence or absence of the material having one of the noted properties, or the position of the edge of a body of such material, in a region between two polarizing screens oriented with their polarizing planes parallel, by destruction of the energy-transmitting character of the two-screen system in so much of the cross section of the energy beam that impinges on the material, and resulting in blocking by the second screen of energy that has impinged on the material while any polarized energy that reaches the second screen without having impinged on the material is transmitted by the second screen.

The polar condition affecting impingement of polarized energy upon the material may be either an impingement upon material that is translucent or transparent to the particular form of radiant energy employed, within the critical angle for complete or partial transmission by the material, or reflective impingement, either diffusive or specular, upon material that is either opaque or transmissive to the particular energy. Polar condition-affecting properties of materials upon energy reflected or transmitted by them have been extensively investigated and are well known. In respect to employment of the invention through utilization of the crossed polarizing screen arrangement, any material that produces a depolarizing effect, as by scattering, will produce the described phenomenon of destroying the blocking effect of the second screen and on orientation of the two screens relative to the material is necessary. When the arrangement is used for material that does not produce scattering but does rotate the plane wherein already polarized radiant energy is oriented, orientation of the two-screen system with respect to the plane into which polarized energy is rotated by impingement upon the material is required to produce maximum difference between the transmitting effect of the second screen upon energy that has and has not impinged on the material.

The arrangement of the two polarizing screens with their polarizing planes aligned for maximum transmission of energy that has not impinged on the material undergoing detection, produces greatest contrast when used with material having the property of rotating the polarization of polarized energy impinging thereon or repolarizing it in another plane, and on such material the screens of the two-screen system most desirably are oriented for greatest contrast between cross sectional areas of emergent energy that has and has not impinged on the material. It is to be emphasized that when the screens are oriented with their polarizing planes parallel, even though the sensed material has a purely scattering effect on the energy that has impinged on it, the second screen has a very material blocking effect on that energy, apparently due to the scattering dispersion of energy that has been polarized by the first screen, and the blocking by the second screen of the large percentage of energy that has been redirected in directions other than corresponding to the polarization plane of the first screen.

Specific forms of polarizable energy that may be employed are well known. Probably visible light and radiant energy of the infra-red spectrum are the most usually employed for such purposes. Hereinafter, the scanning radiant energy is described as light, it being understood that the same principals of utilization apply to other forms of radiant energy that can be polarized.

Experiments, though not by any means exhaustive, have been made with paired light polarizing screens and readily available materials that are transparent and reflective to visible light. Such experiments have been conducted with materials that previously have been recognized as having at least to some extent and to extents that vary from material to material, polarizing effects upon light impinging thereon and transmitted or reflected, effects of rotating planes of polarization of polarized light impinging on them, and effects of scattering depolarization of polarized light impinging on them. It has been ascertained that use of dual polarizing screens in the indicated ways will produce the described results, even though the polarizing effect, or polarization-affecting effect of the tested material is undetectable, at least visually, by employment of a single polarizing screen employed to transmit light either before or after it has impinged on the material. A single transparent material, clear glass, has been tested with failure to exhibit any property of affecting the polar condition of polarized light that the glass has transmitted. Clouded, translucent and frosted glasses have been found to exhibit polarization-affecting properties. Numerous transparent and translucent web materials, as cellophane, paper that has been waxed or otherwise is semi-transparent or translucent, tissue paper, and such materials have been found to exhibit distinct polarizing effects, in some of them such effects being increased while the materials are maintained under tension, in others the increased effect continuing after tension has been removed. Other papers have been found to have only scattering depolarizing effects.

An important field of utilization of the invention is that of detecting and indicating presence or absence of, detecting and indicating the lateral position of the edge of a body of translucent or transparent material such as heretofore has presented serious problems in accomplishing such detection by light sensitive means. Detection of such material can, by employment of the invention, be accomplished by a scanning light beam directed to pass through, that is, to be wholly or partly intercepted by the material by the simple expedient of disposing the polarizing screens to opposite sides of the material for successive transmission of the sensing light. Significantly, by selection of the relative orientation of the screens, either parallel or crossed, the transparent or translucent material may be made to block passage of light through a system of two screens relatively oriented for maximum light transmission in the absence of the material, or it may be made to destroy the light-blocking character and to cause transmission of maximum light by a system of two screens relatively oriented to block light transmission in the absence of the material.

Furthermore, and of great use in fields of edge position detecting, as in web, sheet or plate guiding, or following mechanism, and applicable whether the material is opaque or light-transmissive, the edge is indicated by the line of demarcation between cross sectional areas of the light path wherein light is transmitted respectively at maximum and minimum intensity, and, by selection of relative orientation of the screens selection may be made as to whether the area of maximum intensity transmission corresponds to the part of the light beam cross section that impinges on the material, or to the part of the light beam cross section that does not impinge thereon. Similarly in presence-or-absence detection indicated respectively by light transmission of intensity corresponding to impingement or non-impingement on the material by the full cross section of the beam, maximum light transmission may be assigned either to presence or absence of the material simply by selection of the relative orientation of the two polarizing screens.

A highly useful specific application of the invention is that of maintaining a required transverse position of a longitudinally traveling body such as a web, sheet or plate in a preselected path, by detecting the lateral position of an edge of such body or of a guide line printed thereon, developing a signal of magnitude corresponding to that position, and using that signal as the control signal for relay mechanism that acts to shift the body laterally in response to departure of the detected edge from a required position corresponding to the correct path position. Such systems, wherein sensing of the edge position or line is accomplished by a light sensitive device such as a photoelectric cell, have been highly developed. In some, scanning is accomplished by a light beam directed through the region that includes the required edge position, for partial interception by the marginal body portion or line adjacent the sensed edge and consequent variation of intensity of light reaching the sensing device in correspondence to the lateral position of the sensed edge. Other systems are arranged to direct a light beam to the edge to be sensed at an angle resulting in reflection to the sensing device, either by the marginal portion of the material, or by a reflective surface positioned under and more or less masked by the marginal portion of a body of non-reflective material. In any event, contrast between intensity of light that has impinged on the material, either for transmission through it, or past it, or for reflection from it or from a surface partly masked by it, or of light forming portions of the scanning beam that respectively have and have not impinged upon the sensed material, is necessary to proper signal development by the light-sensitive detector. Detector arrangements for sensing lateral edge positions have been selected for detailed disclosure of the invention, and such arrangements embodying suitable specific forms of the invention are shown in the accompanying drawings, whereof:

Figs. 1 and 2 are somewhat diagrammatic, broken plans respectively showing crossed and parallel orientation of the screens of a detector system embodying the invention.

Figs. 3 and 4 are schematic diagrams of edge position detector and signal developing arrangements embodying the invention and respectively arranged for light-transmissive and light-reflective scanning.

Fig. 5 is a similar view of a modified form of reflective scanning arrangement.

Fig. 6 is a top plan of the arrangement of Fig. 5.

Describing the drawings in detail, and first referring to Figs. 1 to 3, reference numeral 11 indicates a body of transparent or translucent material having a property of affecting the polar condition of light that has been polarized prior to transmission through the material. In accordance with the invention an optical system is arranged to direct a light beam, ray or bundle of rays to a light sensitive device 12 along a path that, at least in part is extended through material 11. As shown in Fig. 3, the system may include a beam projector 13 including a source 14, an objective lens 15, and a collective reflector 16. As shown in Figs. 1 and 2, wherein the cross section of the beam is shown schematically and exaggeratedly by the dotted outlines 16b, the beam and lateral edge 17 of body 11 may be relatively positioned with the latter lying within the bounds of the former, so that parts 18, 19 of the beam pass the edge of and pass through material 11. In accordance with the invention a pair of light polarizing screens 20, 21, the latter being shown broken away in Figs. 1 and 2 to reveal the former, respectively are arranged between projector 13 and material 11, and between the latter and device 12, each in transverse relation to and extended across the path of light from projector 13 to the light sensitive device 12.

Fig. 1 indicates effect of the system upon light reaching device 12 when screens 20, 21 are oriented with the planes wherein they polarize light arranged substantially at right angles. As indicated by the segment of beam 16b designated 23, light in the portion of the path passing the edge 17 of body 11, although polarized by the screen 20 most adjacent projector 13, is not affected visibly. However, as indicated by the heavy shading in segment 24 such light is substantially blocked by the second screen 21, that which is most adjacent the light sensitive device 12. As suggested by the medium shading of segment 25, light which has been polarized by screen 20 may, depending on the particular polar condition affecting property of the particular material 11, more particularly on whether it exerts a polarizing effect that is oriented in crossed relation to that of screen 20, to some extent will be blocked by material 11, or it may be transmitted thereby without visible effect which apparently is more usual. Such light, however, is so strongly transmitted by the second screen 21, as to provide a very marked contrast between intensities of the light that has passed through and that has passed by the edge of material 11. Thus the total degree of illumination of the light sensitive device 12 depends on the cross sectional areas of the light beam portions that pass through and by the edge of material 11, and response of device 12 provides a signal the magnitude of which reliably indicates the lateral position of edge 17, and device 11 readily may be selected to produce a response that linearly is related to change of that edge position. Obviously the system also can be used for simple indication of presence or absence of a body or body portion in the scanning beam between screens 20, 21.

It will be noted from Fig. 1 that with screens 20, 21 oriented with the planes wherein they respectively polarize light disposed substantially at right angles, presence of material 11 between screens 20, 21 will be indicated by emergence from screen 21 of light in the beam cross section portion 19 that has been transmitted by material 11.

Fig. 2 shows the reversed sense, that of light transmission and blocking in areas 18, 19 lying in portions of the scanning beam section that respectively lie without and within the edge 17 of material, and which effect is accomplished by relative orientation of the screens 20, 21 with parallel disposition of the planes wherein respectively they polarize light transmitted through them.

As indicated by the segment 29 of beam 16, light transmitted by screen 20 is not visibly affected although actually polarized as indicated by light shading of segment 30, and it may very slightly be affected by transmission through material 11, usually not to a visibly detectible degree. As shown by the medium shading of segment 31, light in the portion of the beam outside the edge 17 freely is transmitted by the aligned screens 20, 21, but as indicated by the heavy shading of segment 32, light that has been polarized by the first screen 20 and transmitted and its polar condition affected by material 11, in any one or more of the described ways, scattering, polarization rotation or repolarization, is substantially completely blocked by the second screen 21.

The arrangements shown in Figs. 4, 5 and 6 are such as to accomplish alteration of the polar condition of scanning light that has been polarized by a first polarizing screen 35 by reflection. In the Fig. 4 arrangement the sensed material 36 is assumed to have a polar-affecting condition on light directed upon it from a projector 37 at an angle productive of reflection to a light sensitive device 37, which effect is detected and rendered useful by a second screen 38, in ways corresponding to those disclosed in Figs. 1 and 2, and in particular depending on the selected relative orientation of screens 35, 38. Light from projector 37 which passes the edge of material 36 is lost. The value of this arrangement is that, by selection of relative orientation of screens 35, 38 illumination of the light sensitive device can be made either to increase or decrease with increasing area of the part of the beam reflected by the sensed material 36.

The arrangement of Figs. 5 and 6 corresponds to a conventional arrangement for light sensitive edge position detection, wherein, for contrast the detected material 36 is backed by a surface 41 the reflective characteristic of which is selected to provide a material contrast with that of the surface of material 36 as to transmission by the second screen of light that has been reflected from material 36 and from surface 41. The arrangement is shown in a typical web edge detecting assembly wherein surface 41 is provided by a roll 42 over which material is trained. In accordance with the invention, and similar to the arrangement of Fig. 4, first and second polarizing screens 43, 44 respectively are interposed between a light scanning beam projector 45 and the region wherein are located material 36 and surface 41, and between that region and a light sensitive detector device 46. As in the previously described arrangements, relative orientation of screens 43, 44 with respect to planes wherein they polarize lights that they transmit can be selected either for blocking light that is reflected from material 36, and transmitting light reflected from surface 41, as suggested in Fig. 6, or to pass and block light reflected respectively by material 36 and surface 41. Such arrangements involve careful relationship of polar condition affecting properties of material 36 and surface 41, but may be accomplished by selecting as the material providing surface 41 a material having substantially no polar condition affecting property, as a highly polished reflecting material, or a material that rotates the plane of polarization of light that it reflects to a markedly different angular position from that of the plane of polarization of light reflected by material 36.

Advantageously, light sensitive device 12, 37 or 46 may be a conventional photo electric cell connected in an electrical circuit for varying an electrical condition of the circuit, voltage or current, in correspondence to variation in degree of illumination of the cell by light transmitted to it by the second polarizing screen 21, 38 or 44.

Fig. 3 shows a novel circuit arrangement specifically developed for web guiding by means of a scanning beam transmitted through a pair of polarizing screens arranged as above described, 20, 21 in Fig. 3, and for controlling a moving coil-actuated hydraulic relay regulator that is shown as being arranged in accordance with application for United States patents of James H. Kogen, filed May 25, 1956, Serial No. 587,313, entitled Jet Pipe Relay Regulator Actuator. This regulator actuator assembly comprises a jet pipe 51 that is supplied with fluid under pressure for discharge from its end as a forceable jet directed toward a distributor assembly having two narrowly spaced receiver ports 52. The jet pipe is pivoted to swing in the direction of spacing of ports 52, and relative degrees of its registration with the different ports determine balance or sense and magnitude of unbalance of pressures developed in them by kinetic energy of the jet. Such pressures are transmitted, via pipes 66 and 67, to a power unit, typically a cylinder and piston assembly 68, which in web guiding may be employed to shift body 11 laterally to correct departure of its edge from a preselected lateral position. Jet pipe 51 is positioned by relative forces exerted by a setting spring 53 and a force transmission rod 54 that carries a coil 55 connected in the signal circuit and positioned in the annular field of a loudspeaker type magnet 56. Rod 54 is supported for axial movement by a bearing 57 and a leaf spring 58.

The signal circuit that includes device 12, here a photosensitive cell, comprises an energizing transformer 59 connected with a conventional full wave rectifier 60, and coil 55 is series connected with device 12 across the rectifier terminals. A filter condenser 61 is shown connected across coil 55. The arrangement is such that force developed by coil 55 and transmitted to jet pipe 51 by rod 54, and the position of pipe 51, depend on magnitude of direct current energizing coil 55, which in turn depends on degree of illumination of device 12, and consequently on the position of the edge, 17 in Figs. 1 and 2, of the body 11.

The circuit arrangement shown in Figs. 4 and 5 is more conventional, comprising a direct voltage source 63 with which a dropping resistance and the light sensitive device 37 or 46 are series connected to produce across signal conductors 64, 64 a voltage signal the magnitude of which corresponds to the position of the sensed edge of body 36.

From the foregoing, assemblies and arrangements employing and embodying the invention herein disclosed readily will be apparent and it is to be understood that the limits of the invention are to be determined solely from the appended claims as distinguished from the exemplary specific disclosures herein made.

I claim:

1. A polarized light system for web edge control wherein said web is of the type which can alter the polar condition of polarized light impinging thereon, said system comprising a source of light arranged to provide a concentrated light beam, a photo-electric cell positioned to intercept said light beam, said light beam being arranged to impinge upon the edge portion of said web as the beam passes from the light source to the photo-electric cell, a first light polarizing screen positioned in the light beam between the light source and the web, a second light polarizing screen positioned in the light beam between the web and the photo-electric cell, a moving coil-actuated hydraulic relay regulator, web guiding means operative to control the edge position of the web, said web guiding means being operable by said relay regulator, and electrical circuit means including said photo-electric cell arranged to regulate electrical energization of the relay regulator in proportion to the intensity of light impinging on the photo-electric cell.

2. A polarized light system for web edge control wherein said web is of the type which can alter the polar condition of polarized light impinging thereon, said system comprising a source of light arranged to provide a concentrated light beam, a photo-electric cell positioned in the path of said light beam, said light beam being arranged substantially normal to the plane of said web and at one edge thereof, a pair of light polarizing screens positioned so that the web passes therebetween and being further positioned in the path of said light beam between said source and said photo-electric cell, a moving coil-actuated hydraulic relay regulator, web guiding means operative to control the edge position of the web, said web guiding means being operable by said relay regulator, and electrical circuit means including said photo-electric cell arranged to regulate electrical energization of the relay regulator in proportion to the intensity of light impinging on the photo-electric cell.

3. A polarized light system for web edge control wherein said web is of the type which can alter the polar condition of polarized light impinging thereon, said system comprising a source of light arranged to provide a concentrated light beam, said light beam being directed at one edge of the web and being reflected thereby, a photo-electric cell positioned to receive said reflected light beam, a first light polarizing screen positioned in the light beam between the light source and the web, a second light polarizing screen positioned in the light beam between the web and the photo-electric cell, a moving coil-actuated hydraulic relay regulator, web guiding means operative to control the edge position of the web, said web guiding means being operable by said relay regulator, and electrical circuit means including said photo-electric cell arranged to regulate electrical energization of the relay regulator in proportion to the intensity of reflected light impinging on the photo-electric cell.

References Cited in the file of this patent

UNITED STATES PATENTS

| 2,075,094 | Chubb | Mar. 30, 1937 |
| 2,107,836 | Pineo | Feb. 8, 1938 |
| 2,474,906 | Meloon | July 5, 1949 |
| 2,651,771 | Palmer | Sept. 8, 1953 |